(12) United States Patent
Zelmanov et al.

(10) Patent No.: US 7,992,913 B2
(45) Date of Patent: Aug. 9, 2011

(54) FOLD FLAT SEAT ASSEMBLY

(75) Inventors: Dmitriy Zelmanov, Oak Park, MI (US); Rabindranath Persad, Brighton, MI (US); Prasad D. Jagtap, Farmington, MI (US); Shriram Shivanand Pathak, Farmington, MI (US)

(73) Assignee: Intier Automotive Inc, Newmarket, Ontario (CA)

( * ) Notice: Subject to any disclaimer, the term of this patent is extended or adjusted under 35 U.S.C. 154(b) by 209 days.

(21) Appl. No.: 12/296,606

(22) PCT Filed: Apr. 12, 2007

(86) PCT No.: PCT/CA2007/000602
§ 371 (c)(1),
(2), (4) Date: Oct. 9, 2008

(87) PCT Pub. No.: WO2007/115413
PCT Pub. Date: Oct. 18, 2007

(65) Prior Publication Data
US 2009/0152888 A1    Jun. 18, 2009

(51) Int. Cl.
*B60N 2/30* (2006.01)
(52) U.S. Cl. .................................................. 296/65.05
(58) Field of Classification Search ............... 296/65.05, 296/65.09, 65.16, 65.01; 297/94, 95, 110
See application file for complete search history.

(56) References Cited

U.S. PATENT DOCUMENTS

| | | | | |
|---|---|---|---|---|
| 2,956,837 A * | 10/1960 | Koplin | | 296/66 |
| 3,097,881 A * | 7/1963 | Aguilar | | 296/66 |
| 4,227,736 A * | 10/1980 | Lebault et al. | | 296/65.09 |
| 4,771,507 A * | 9/1988 | Draplin et al. | | 16/297 |
| 6,113,187 A | 9/2000 | Sugiyama | | |
| 6,183,033 B1 * | 2/2001 | Arai et al. | | 296/65.09 |
| 6,568,736 B2 | 5/2003 | Jach | | |
| 6,568,756 B2 * | 5/2003 | Sugimoto et al. | | 297/335 |
| 6,595,587 B2 * | 7/2003 | Konishi et al. | | 297/331 |
| 6,666,512 B1 * | 12/2003 | Timon | | 297/335 |
| 6,702,355 B1 * | 3/2004 | Price et al. | | 296/37.16 |
| 6,767,040 B1 * | 7/2004 | Freijy | | 296/65.09 |
| 6,817,645 B2 * | 11/2004 | Taguchi et al. | | 296/64 |
| 6,899,392 B1 * | 5/2005 | Saberan et al. | | 297/334 |
| 6,997,500 B2 | 2/2006 | Horsford et al. | | |
| 7,188,883 B2 * | 3/2007 | Van Dyk et al. | | 296/65.01 |
| 7,192,088 B1 * | 3/2007 | Trombley et al. | | 297/335 |
| 7,300,090 B2 * | 11/2007 | Rana et al. | | 296/65.09 |

FOREIGN PATENT DOCUMENTS

| | | |
|---|---|---|
| CA | 2364711 A1 | 6/2002 |
| CA | 2498857 A1 | 4/2004 |
| CA | 2499793 A1 | 9/2005 |

* cited by examiner

*Primary Examiner* — H Gutman
(74) *Attorney, Agent, or Firm* — Miller Canfield

(57) ABSTRACT

A seat assembly has a seat cushion pivotally supported by a pair of front support links for movement between a seating position for supporting a seat occupant and a stowed position. A seat back is pivotally supported by a pair of recliner mechanism for movement between an upright position and a stowed position. The seat cushion moves from the seating position to the stowed position in response to pivotal movement of the seat back from the upright position to the stowed position. A J-link extends between the seat back and the front support links. A torsion spring biases the seat cushion to the stowed position. A control cable operatively couples the seat back and the seat cushion. A pair of support legs automatically deploy as the seat cushion rotates to the stowed position.

17 Claims, 14 Drawing Sheets

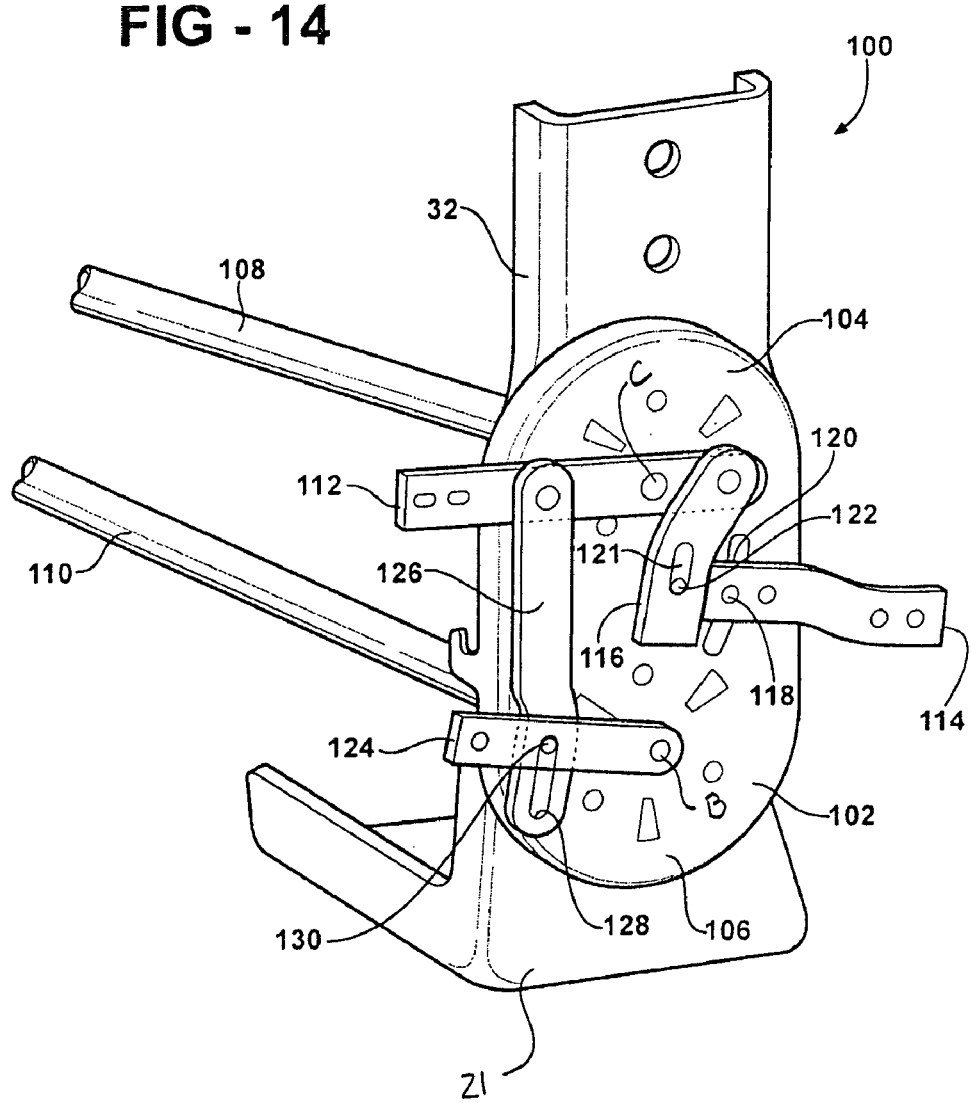

FOLD FLAT SEAT ASSEMBLY

FIELD OF THE INVENTION

The present invention relates to a fold flat seat assembly for an automotive vehicle. More particularly, the present invention relates to a fold flat seat assembly including a seat cushion which is automatically pivoted from a seating position to a stowed position in response to pivotal movement of a seat back from an upright position to a fold flat position aligned horizontally with the seat cushion and providing an extended cargo load floor.

DESCRIPTION OF RELATED ART

Seat assemblies for automotive vehicles commonly include one or more rows of rear seat assemblies including a seat cushion and a seat back pivotally coupled to the seat cushion by a recliner mechanism. It is often desirable to pivot or fold both the seat cushion and the seat back downwardly and against the floor of the vehicle to a fold flat position providing a cargo load floor in the vehicle. The seat cushion is commonly pivotally coupled to the floor of the vehicle by seat risers or legs and pivotal from a generally horizontal seating position to a forwardly folded and upright tumbled position. The seat back is then commonly pivoted from a generally upright position to a forwardly folded flat position adjacent the upright seat cushion.

It is also known for the recliner mechanism to enable the seat back to pivot between the upright seating position and a plurality of reclined positions as well as pivot forwardly and downwardly overlying the seat cushion in a fold flat position. However, the overall stack height of the seat back on top of the seat cushion consumes much of the desired storage space in the vehicle and frustrates the desire for a flat and flush cargo load floor.

It remains desirable to provide a seat assembly which folds flat against the floor of the vehicle wherein the seat cushion is flush with the seat back to form a contiguous flat load floor. It also remains desirable to provide a seat assembly wherein the seat cushion automatically pivots from the seating position to the flat stowed position in response to pivotal movement of the seat back from the upright position to the fold flat position.

SUMMARY OF THE INVENTION

According to one aspect of the invention, a seat assembly is provided for supporting an occupant above a floor in an automotive vehicle. The seat assembly comprises a seat cushion pivotally supported by a pair of front support links for movement between a seating position for supporting a seat occupant and a stowed position pivoted 180 degrees and provide a cargo load floor. A seat back is pivotally supported by a pair of recliner mechanism for movement between an upright position for supporting a seat occupant and a stowed position generally parallel with the floor of the vehicle. A fold flat mechanism automatically pivots the seat assembly from the seating position to the stowed position in response to pivotal movement of the seat back from the upright position to the stowed position. The fold flat mechanism includes a pair of J-links extending between the seat back and the front support links for rotating the support links in response to pivotal movement of the seat back, a torsion spring coupled between the seat cushion and at least one of the front support links for biasing the seat cushion to the stowed position, and a control cable operatively coupled between the seat back and the seat cushion for controlling the biased pivotal movement of the seat cushion as the seat back pivots from the upright position to the stowed position.

According to another aspect of the invention, the seat assembly includes a pair of support legs pivotally coupled to the seat cushion for supporting the seat cushion above the floor of the vehicle in the stowed position. A control link is operatively coupled between the support legs and the support links for automatically pivoting the support legs between a retracted position recessed against the seat cushion in the seating position and an extended position extending generally perpendicularly from the seat cushion in the stowed position.

BRIEF DESCRIPTION OF THE DRAWINGS

Advantages of the present invention will be readily appreciated as the same becomes better understood by reference to the following detailed description when considered in connection with the accompanying drawings wherein:

FIG. 14 is a perspective view of the recliner mechanism operatively coupled between the seat cushion and seat back.

DETAILED DESCRIPTION OF THE PREFERRED EMBODIMENT

Figure 1:
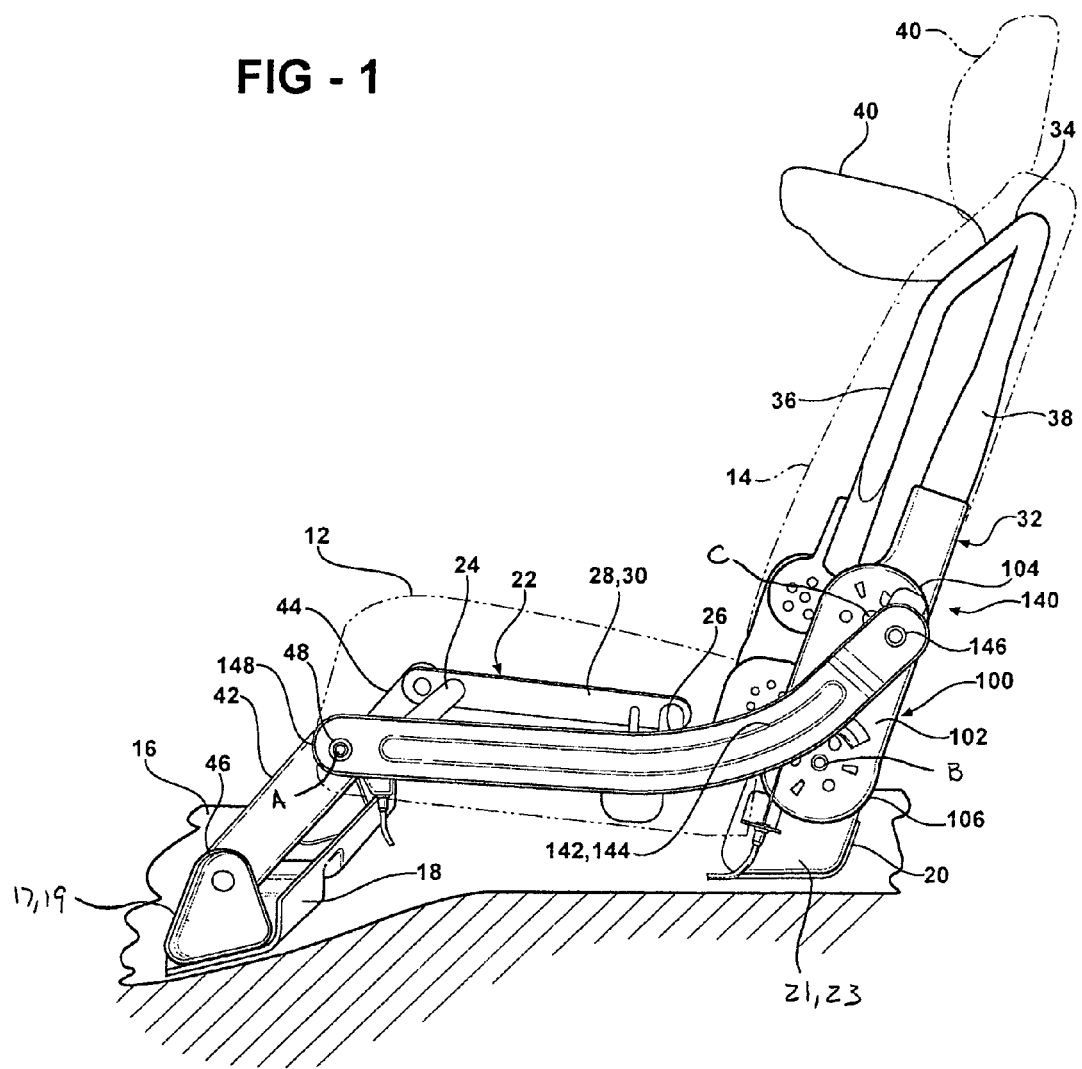
FIG. 1 is a perspective view of the seat assembly according to one aspect of the invention in a design seating position.

Referring to FIG. 1, a seat assembly for use in an automotive vehicle is generally shown at 10 in a design seating position. The seat assembly 10 includes a seat cushion 12 and a seat back 14 for supporting a seat occupant above a floor 16 of the vehicle. The seat assembly 10 is supported by front and rear cross support plates 18, 20 for removably mounting the seat assembly 10 to the floor 16 of the vehicle. Each of the cross support plates 18, 20 may include one or more latch assemblies for releasably engaging with striker bars mounted to the floor 16 to latch the seat assembly 10 to the floor 16 as is commonly known to one skilled in the art. Cross support plate 18 has a pair of risers 17, 19 at each end thereof. Similarly, cross support plate has a pair of risers 21, 23 at each end thereof. Cross support plates 18, 20 are provided to simplify the installation of the seat assembly 10 onto the floor 16 of the vehicle. It is possible to install the seat assembly 10 directly on the floor, without the cross support plates 18, 20 without departing from the scope of the present invention.

The seat cushion 12 includes a seat cushion frame 22 for supporting a cellular foam pad encased in a trim cover as is commonly known in the art. The seat cushion frame 22 includes front and rear cross tubes 24, 26 interconnected at opposing distal ends by lateral side frame members 28, 30.

The seat back 14 similarly includes a generally U-shaped seat back frame 32 for supporting a cellular foam pad encased in a trim cover as is commonly known in the art. The seat back frame 32 includes an upper cross tube 34 extending laterally between upright side members 36, 38. One or more folding head restraints 40 may be operatively mounted to the upper cross tube 34.

A pair of front support links 42, 44 pivotally supports the seat cushion 12 above the floor 16 of the vehicle. More specifically, the front support links 42, 44 include a first end 46 pivotally connected to the risers 17, 19 of the front cross support plate 18 and an opposite second end 48 pivotally connected to the seat cushion frame 22. The front support links 42, 44 pivotally support the seat cushion 12 for rotation about a first axis A between a generally horizontal seating position spaced above the floor 16 for supporting a seat occupant thereon, as shown in FIG. 1; an intermediate stowed position pivoted forwardly and generally upright, as shown in FIG. 3; and a fully stowed position pivoted generally 180 degrees, presenting an underside of the seat cushion 12 facing upwardly and parallel with the floor 16, as shown in FIG. 4.

Referring to FIGS. 6 and 8-10, the seat cushion 12 further includes a pair of retractable support legs 50, 52 pivotally connected to the seat cushion frame 22 for automatically extending and supporting the seat cushion 12 in the fully stowed position in response to pivotal movement of the seat cushion 12 from the seating position to the fully stowed position. More specifically, each support leg 50, 52 includes a first end 54 pivotally connected to the respective side frame member 28, 30 of the seat cushion frame 22 adjacent the rear cross tube 26 by pivot 58 and an opposite second distal end 56. The first end 54 includes a guide pin 60 projecting therefrom and spaced from the pivot 58. A control link 62 extends between a first end 64 pivotally connected to the front support link 42, 44 and a second end 66 operatively coupled to the guide pin 60. The second end 66 includes an elongated slot 68 therein for slidably receiving and guiding the guide pin 60 along the length thereof. In the seating position, the support legs 50, 52 are retracted and aligned parallel to the lateral side frame members 28, 30. In operation, as the seat cushion 12 pivots from the seat position, FIG. 6, to the intermediate stowed position, FIG. 10, the control link 62 is pulled by the support legs 50, 52 causing the guide pin 60 to slide along the elongated slot 68 in the control link 62 and maintaining the support legs 50, 52 in the retracted position. Once the guide pin 60 reaches the end of the elongated slot 68 in the intermediate stowed position, further pivotal movement of the seat cushion 12 towards the fully stowed position, FIGS. 8 and 9, causes the control link 62 to pull on the guide pin 60 and pivot the support legs 50, 52 about the pivot 58 to automatically extend the legs 50, 52 downwardly and generally perpendicular to the side frame members 28, 30 to engage the floor 16 and support the seat cushion 12 in the fully stowed position spaced above the floor 16 of the vehicle. Upon pivotally returning the seat cushion 12 from the fully stowed position to the intermediate stowed position, the guide pin 60 slides along the slot 68 until abutting the opposite end thereof. The support links 42, 44 continue to push on the control link 62, and therefore the guide pin 60, automatically pivoting and retracting the support legs 50, 52 from the extended position to the retracted position as the seat cushion 12 further pivots from the intermediate stowed position to the seating position.

Figure 13:
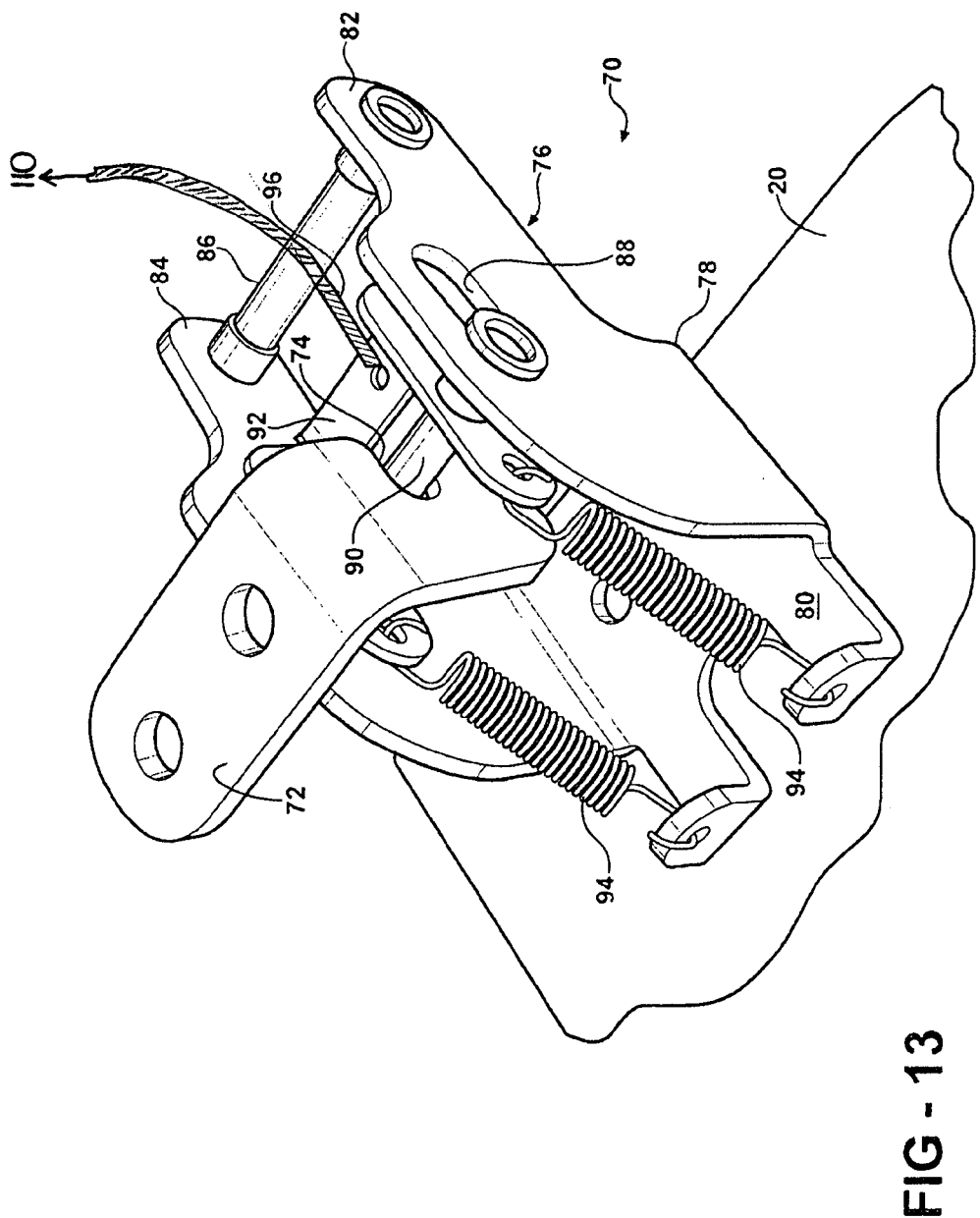
FIG. 13 is a perspective view of a latch assembly for locking the seat cushion in the seating position.

Referring to FIG. 13, the seat assembly 10 further includes a seat cushion latch 70 for releasable latching the seat cushion 12 in the seating position. The seat cushion latch 70 includes a latch plate 72 fixedly secured to the seat cushion frame 22 and having a generally U-shaped slot 74 therein. The seat cushion latch 70 further includes a striker mechanism 76 fixedly secured to the rear cross support plate 20 for engagement with the latch plate 72. The striker mechanism 76 includes a support frame 78 fixedly mounted to the rear cross support plate 20 and defined by a base plate 80 and a pair of spaced apart guide plates 82, 84 interconnected by a pulley rod 86. Each of the guide plates 82, 84 includes an elongated slot 88 therein for slidably supporting and guiding opposing ends of a striker bar 90. The striker bar 90 is further supported by a carriage 92. A pair of springs 94 extends between the carriage 92 and the base plate 80 to continuously bias the striker bar 90 into the slot 74 of the latch plate 72 and releasably latch the seat cushion 12 in the seating position. A Bowden-type release cable 96 extends from the carriage 92 opposite the springs 94 for pulling the carriage 92 and sliding the striker bar 90 along the slots 88 in the guide plates 82, 84 to release the striker bar 90 from the slot 74 in the latch plate 72 and release the seat cushion 12 for pivotal movement from the seating position to one of the intermediate or fully stowed positions.

Figure 2:
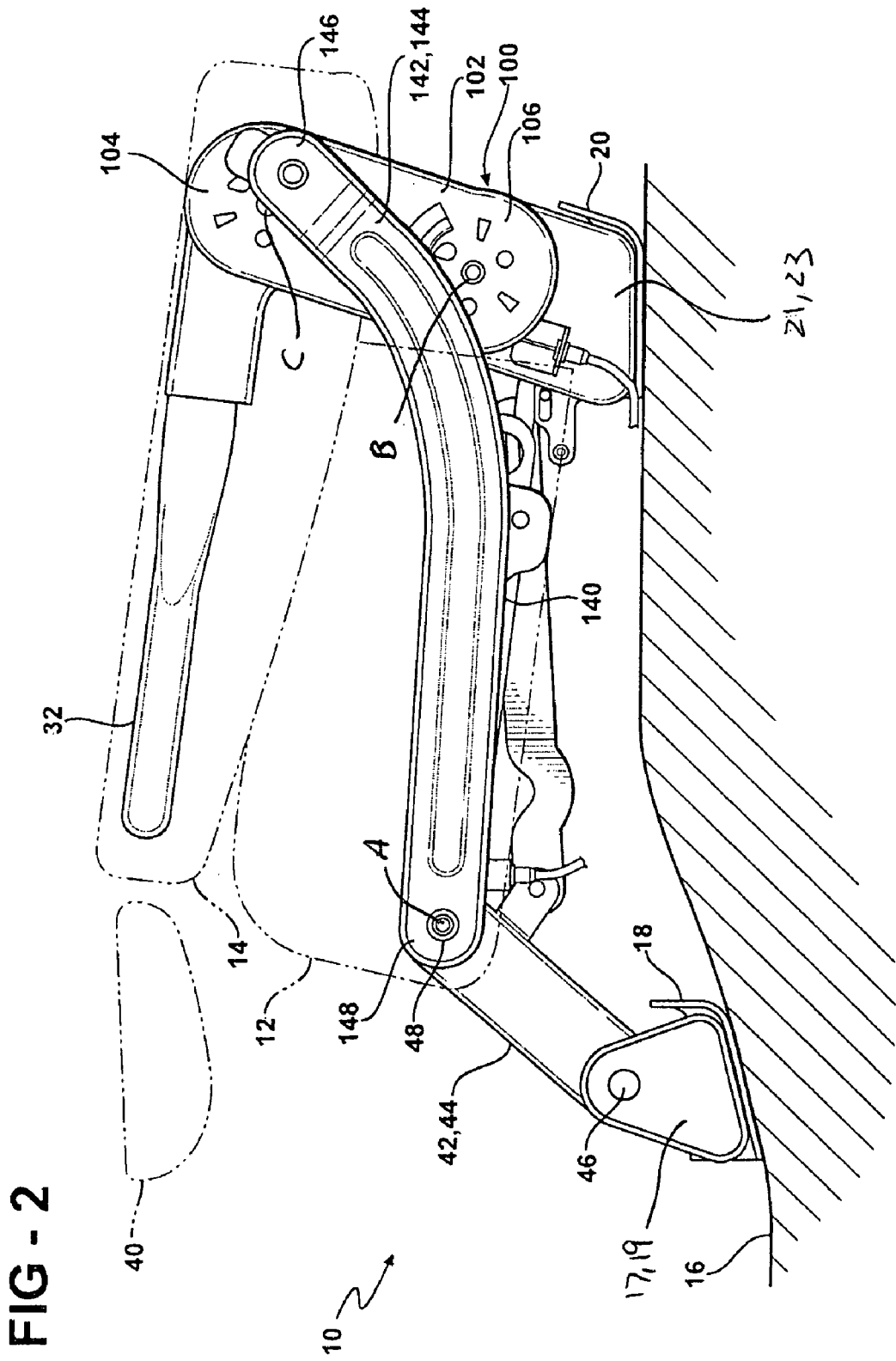
FIG. 2 is a side view of the seat assembly in a fold flat position.
Figure 3:
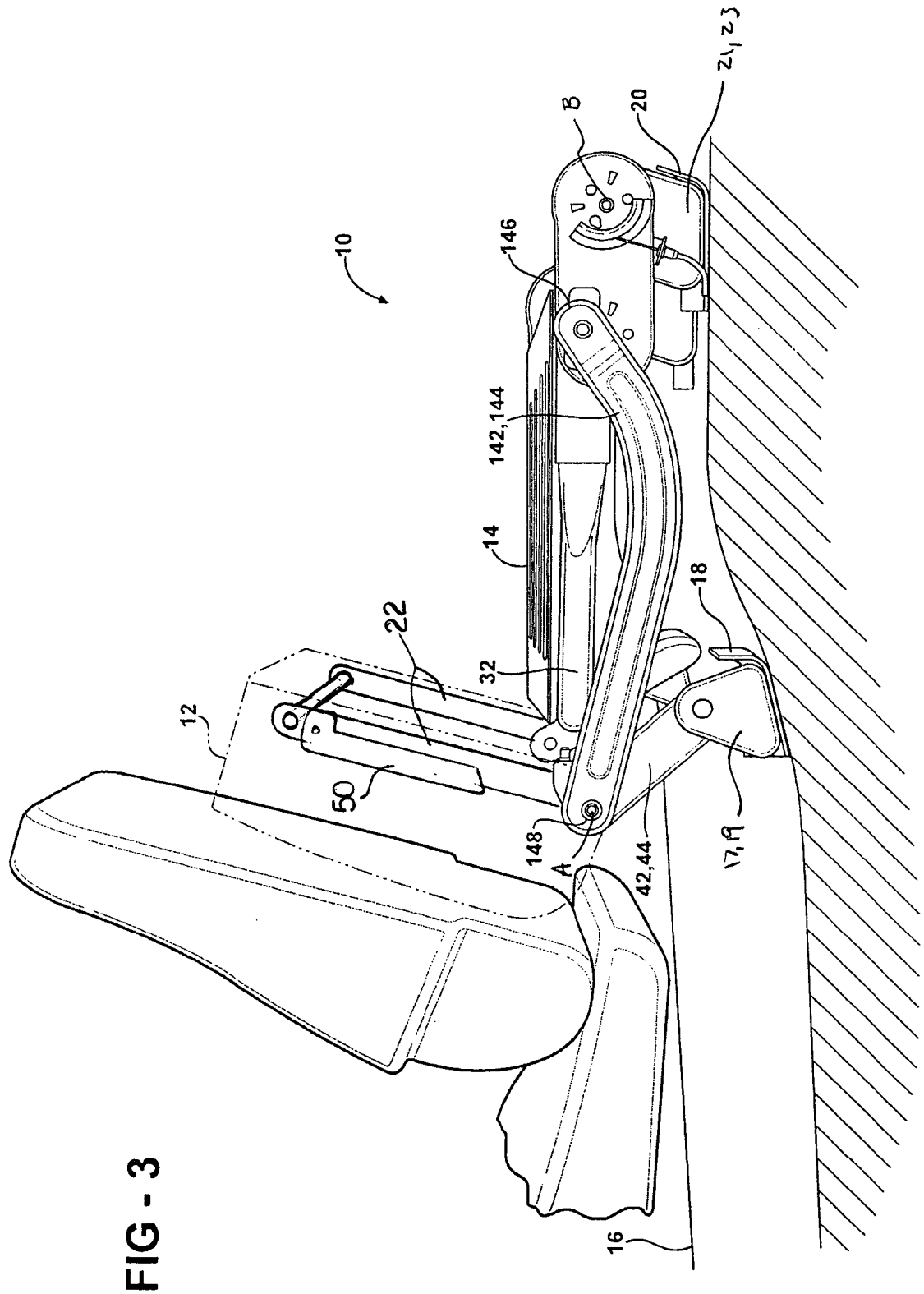
FIG. 3 is a perspective view of the seat assembly in an intermediate stowed position.
Figure 4:
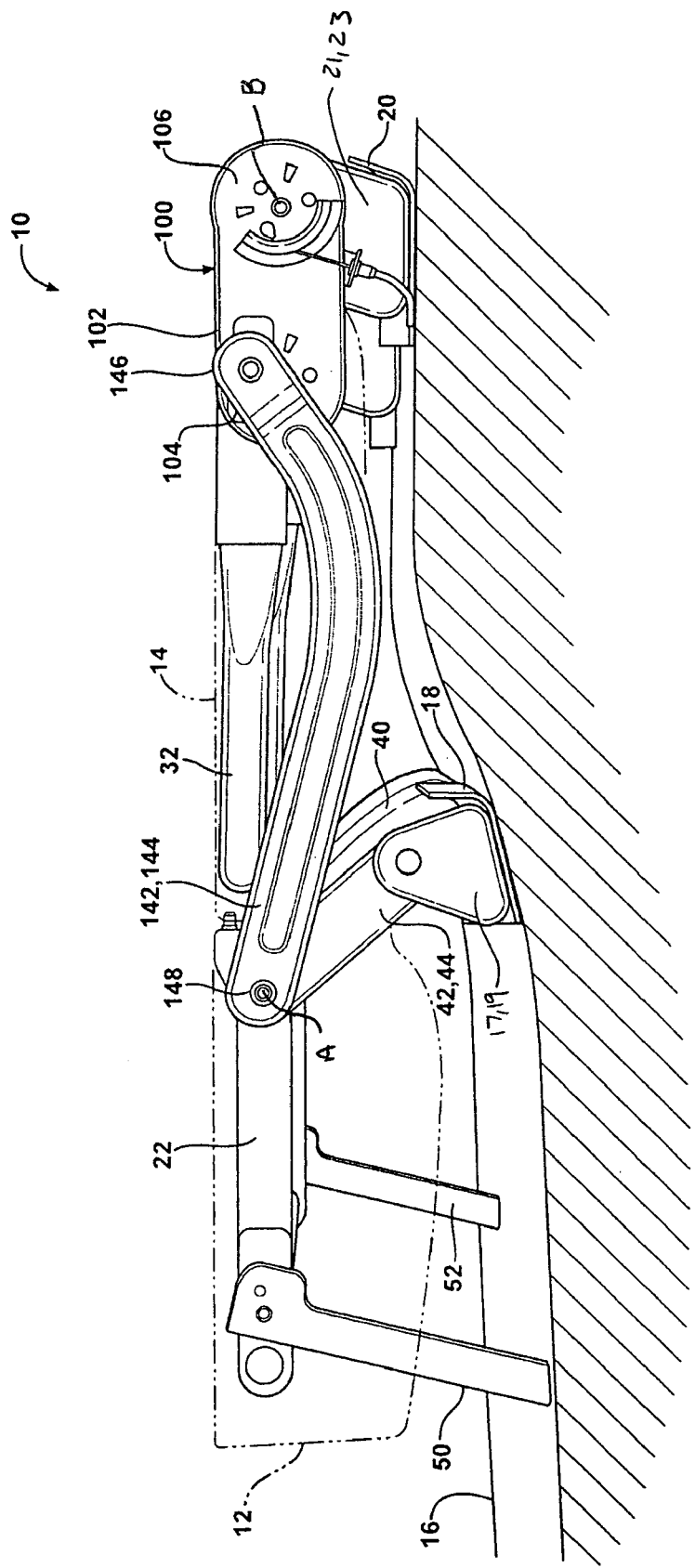
FIG. 4 is a perspective view of the seat assembly in a fully stowed position.
Figure 5:
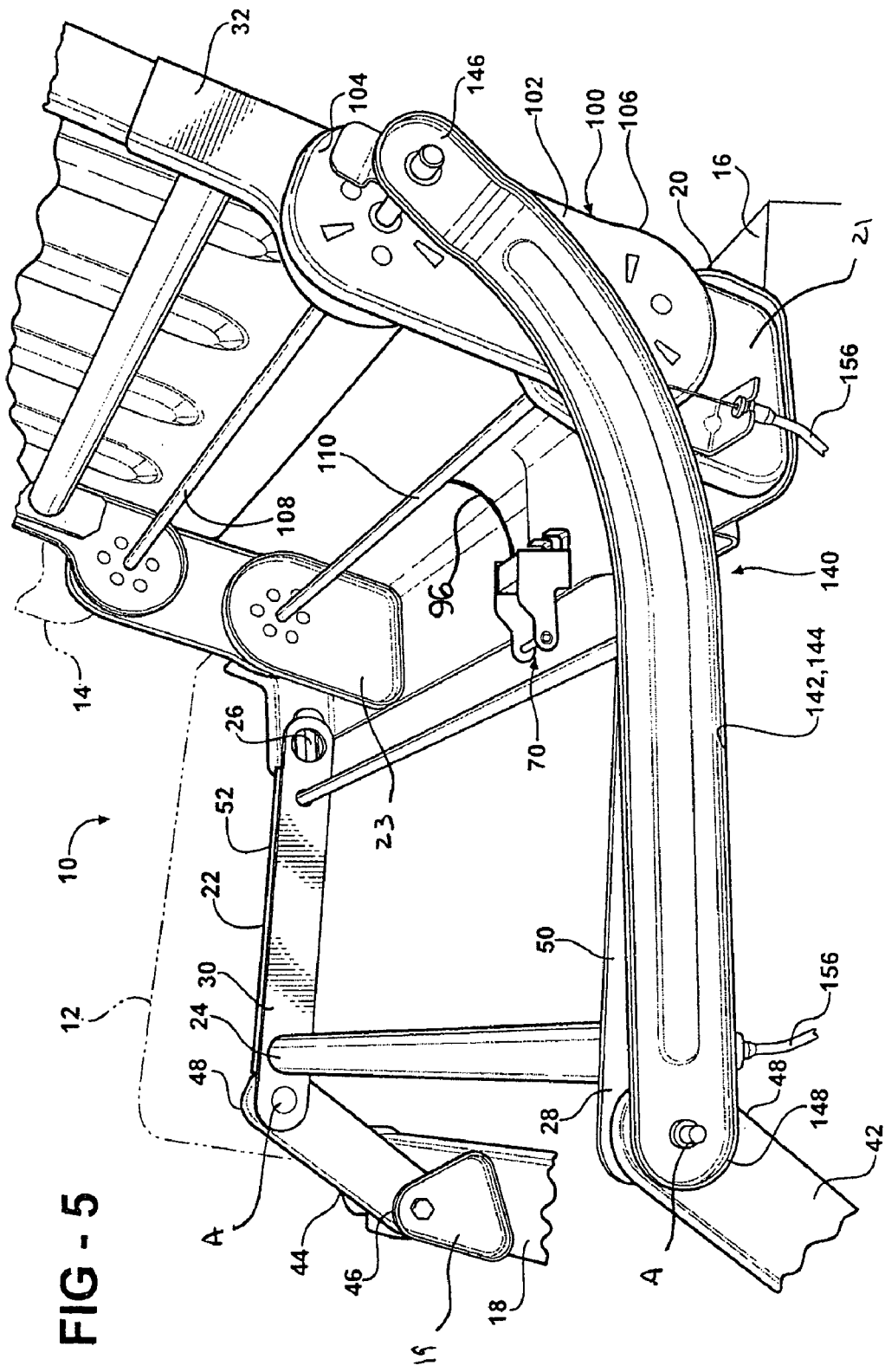
FIG. 5 is an enlarged, fragmentary perspective view of the seat assembly of FIG. 1 in the design seating position.
Figure 6:
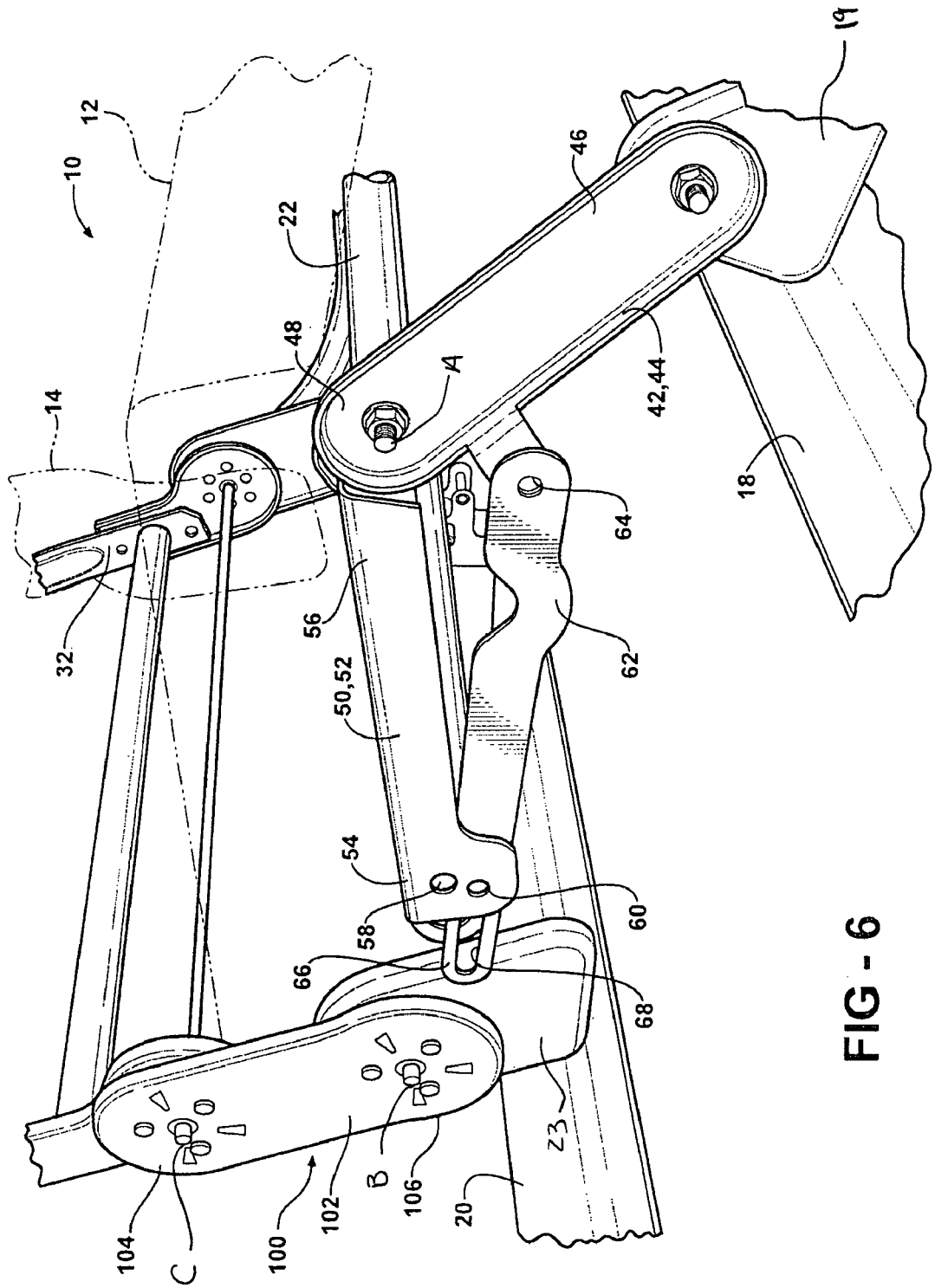
FIG. 6 is another fragmentary, perspective view of the seat assembly in the design seating position.

Referring to FIGS. 1-5, the seat assembly 10 includes a pair of recliner mechanisms 100 disposed along opposing lateral sides of the seat back 14 for pivotally supporting the seat back 14 between a plurality of positions. Each recliner mechanism 100 includes a recliner bracket 102 supporting an upper disc recliner 104 operatively coupled between the recliner bracket 102 and the side member 36, 38 of the seat back frame 32 and a lower disc recliner 106 operatively coupled between the recliner bracket 102 and the rear risers 21, 23 of rear cross support plate 20. The upper disc recliner 104 provides selective pivotal movement of the seat back 14 about a third axis C between the upright position, as shown in FIG. 1, a plurality of rearward reclined positions, and a forwardly folded flat position overlying the seat cushion 12, as shown in FIG. 2. The lower disc recliner 106 provides selective pivotal movement of the seat back 14 about a second axis B between the upright position, as shown in FIG. 1, and a fully stowed position parallel with the floor 16 of the vehicle, as shown in FIGS. 3 and 4.

More specifically, referring to FIG. 14, the recliner mechanism 100 is shown in more detail. Each of the disc recliners 104, 106 of the recliner mechanisms 100 on opposing sides of the seat back 14 are interconnected by corresponding upper and lower cross tubes 108, 110 to gang the operation and synchronize the function of the disc recliners 104, 106. The recliner mechanism 100 shown in FIG. 14 includes a recliner release lever 112 connected to the upper disc recliner 104 for release the upper disc recliner 104 and allow the seat back 14 to pivot from the upright position to any of the occupant chosen rearward reclined positions. A fold flat release lever 114 is pivotally connected to the recliner bracket 102 and operatively coupled to the recliner release lever 112 via a fold flat release link 116 to release the upper disc recliner 104 and allow the seat back 14 to pivot from the upright position, or any of the reclined positions, to the forwardly folded flat position overlying the seat cushion 12. The fold flat release lever 114 includes a blocking pin 118 guided within a slot 120 in the recliner bracket 102 for engaging a portion of the seat back frame 32 to prevent the seat back 14 from pivoting to the forwardly folded flat position unless the fold flat release lever 114 is actuated. That is, the blocking pin 118 prevents incidental pivotal movement of the seat back 14 to the forwardly folded flat position upon actuation of only the recliner release lever 112. The release link 116 includes an elongated slot 121 for receiving a release pin 122 in a lost motion connection such that when only the recliner release lever 112 is actuate, the release pin 118 slides within the slot 120 and does not allow actuation of the fold flat release lever 116, thus maintaining blocking engagement of the blocking pin 118 with the seat back frame 32 to prevent pivotal movement to the forwardly folded flat position. If it desirable to pivot the seat back 14 to the forwardly folded flat position, the fold flat release lever 114 must be operator actuated by pivotal movement in the counterclockwise direction as shown to release the blocking pin 118 from engagement with the seat back frame 32. The pivotal movement of the fold flat release lever 114 pulls on the release link 116 to simultaneously actuate the recliner release lever 112 and allow the seat back 14 to pivot in either direction.

The recliner mechanism 100 also includes a stow release lever 124 operatively coupled to the lower disc recliner 106 releasing the lower disc recliner 106 and allowing pivotal movement of the seat back 14 about the second axis to the fully stowed position. A stow release link 126 includes a first end pivotally connected to the recliner release lever 112 and a second end coupled to the stow release lever 124. The second end includes an elongated slot 128 therein for receiving a coupling pin 130 extending from the stow release lever 124 providing a lost motion connection. The stow release link 126 ensures that the seat back 14 is returned from any of the reclined positions to the upright position prior to pivotal movement of the seat back 14 to the fully stowed position. That is, as the stow release lever 124 is operator actuated by pivotal movement in the clockwise direction as shown, the coupling pin 130 pushes upwardly on the stow release link 126 to actuate the recliner release lever 112. If the seat back 14 is in any of the recliner positions, it will return to the upright position. However, the seat back 14 is prevent from over rotating or pivoting beyond the upright position by the blocking pin 118 engaging the seat back frame 32. With the seat back 14 is the upright or home position, the seat back 14 may be further pivoted about the lower disc recliner 106 or second axis to the fully stowed position aligned parallel with the floor 16 of the vehicle, presenting the backside of the seat back 14 to face upwardly.

Additionally, stow release lever 124 also actuates latch 70 and releases seat cushion 12. Stow release lever is coupled to rod 110, which is in turn coupled to cable 96.

Still further, the seat assembly 10 includes a fold flat mechanism 140 for automatically pivoting the seat cushion 12 about the first axis from the seating position to the intermediate stowed and fully stowed positions in response to pivotal movement of the seat back 14 from the upright position to the fully stowed position. The fold flat mechanism 140 includes a pair of J-links 142, 144 arranged on opposing lateral sides of the seat assembly 10 each having a first end 146 pivotally coupled to the recliner bracket 102 and an opposite second end 148 pivotally coupled to the first end 46 of the front support links 42, 44. As the seat back 14 pivots about the second axis of the lower disc recliner 106 from the upright position to the fully stowed position, the J-links 142, 144 push forwardly on the front support links 42, 44 to pivot the links 42, 44 from the position shown in FIG. 1 to the position shown in FIG. 3.

Figure 7:
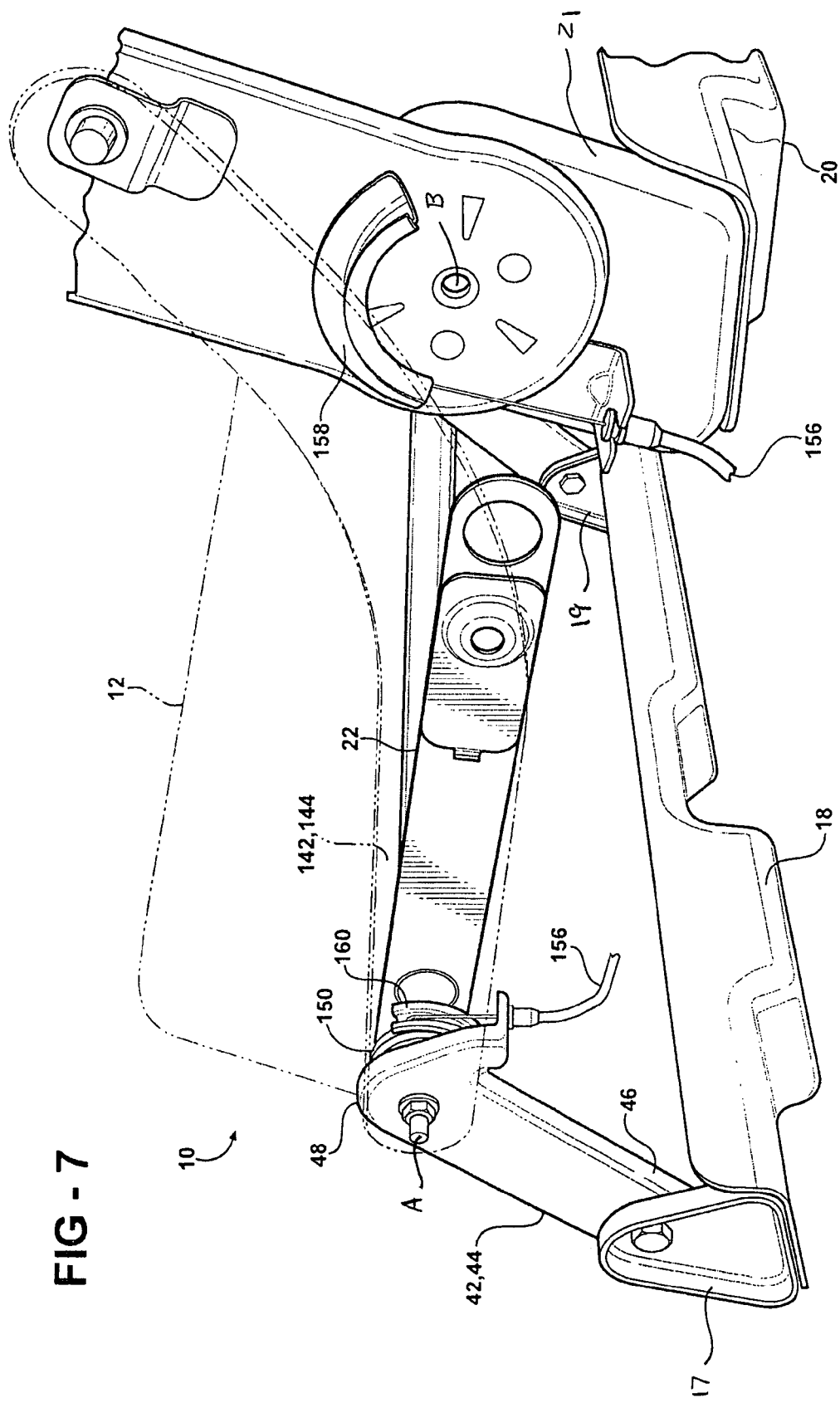
FIG. 7 is yet another fragmentary, perspective view of the seat assembly in the design seating position.
Figure 8:
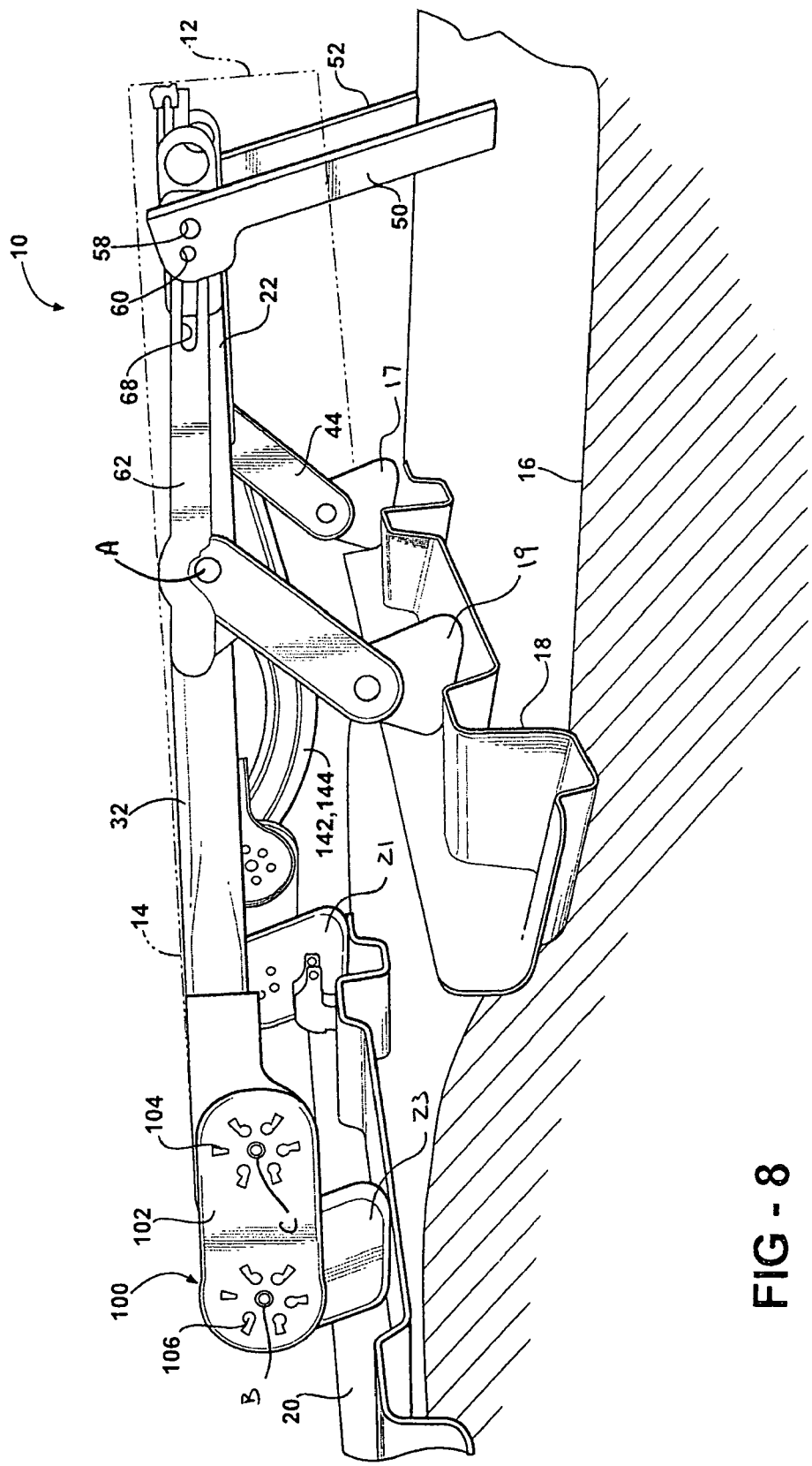
FIG. 8 is another perspective view of the seat assembly in the fully stowed position.
Figure 9:
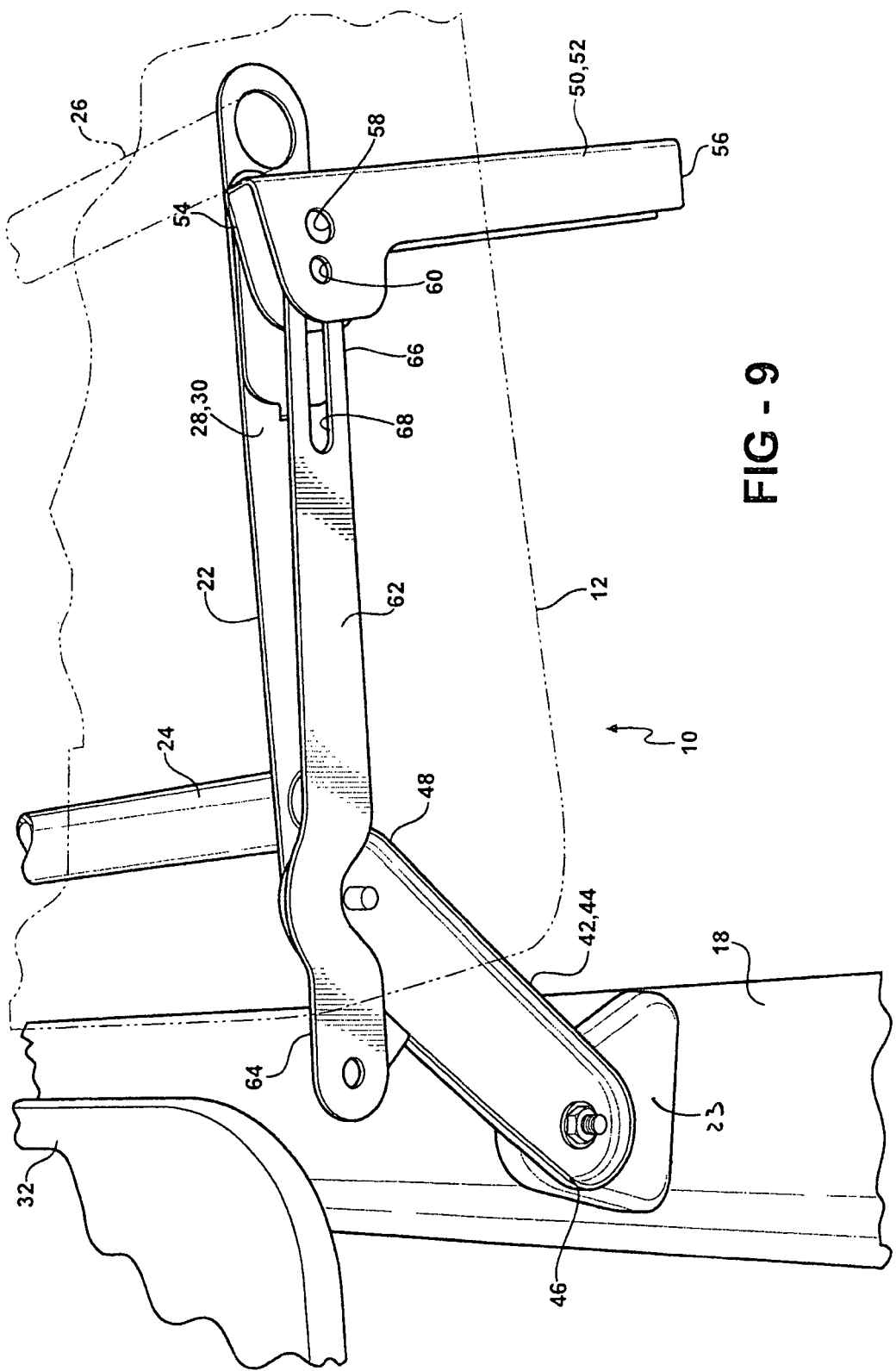
FIG. 9 is an fragmentary perspective view of the seat cushion in the fully stowed position.
Figure 10:
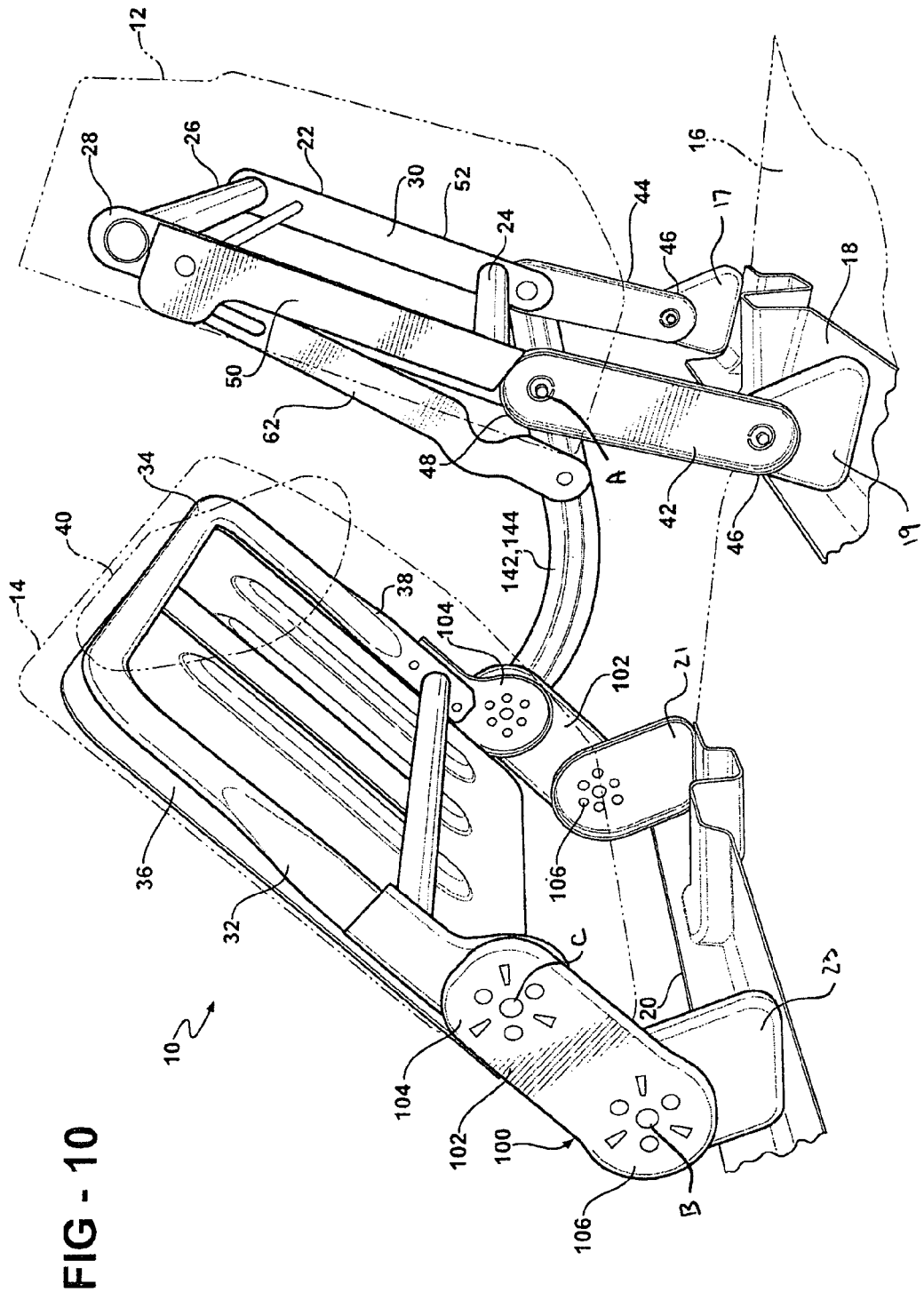
FIG. 10 is a perspective view of the seat assembly partially pivoted between the design seating position and the intermediate stowed position.
Figure 11:
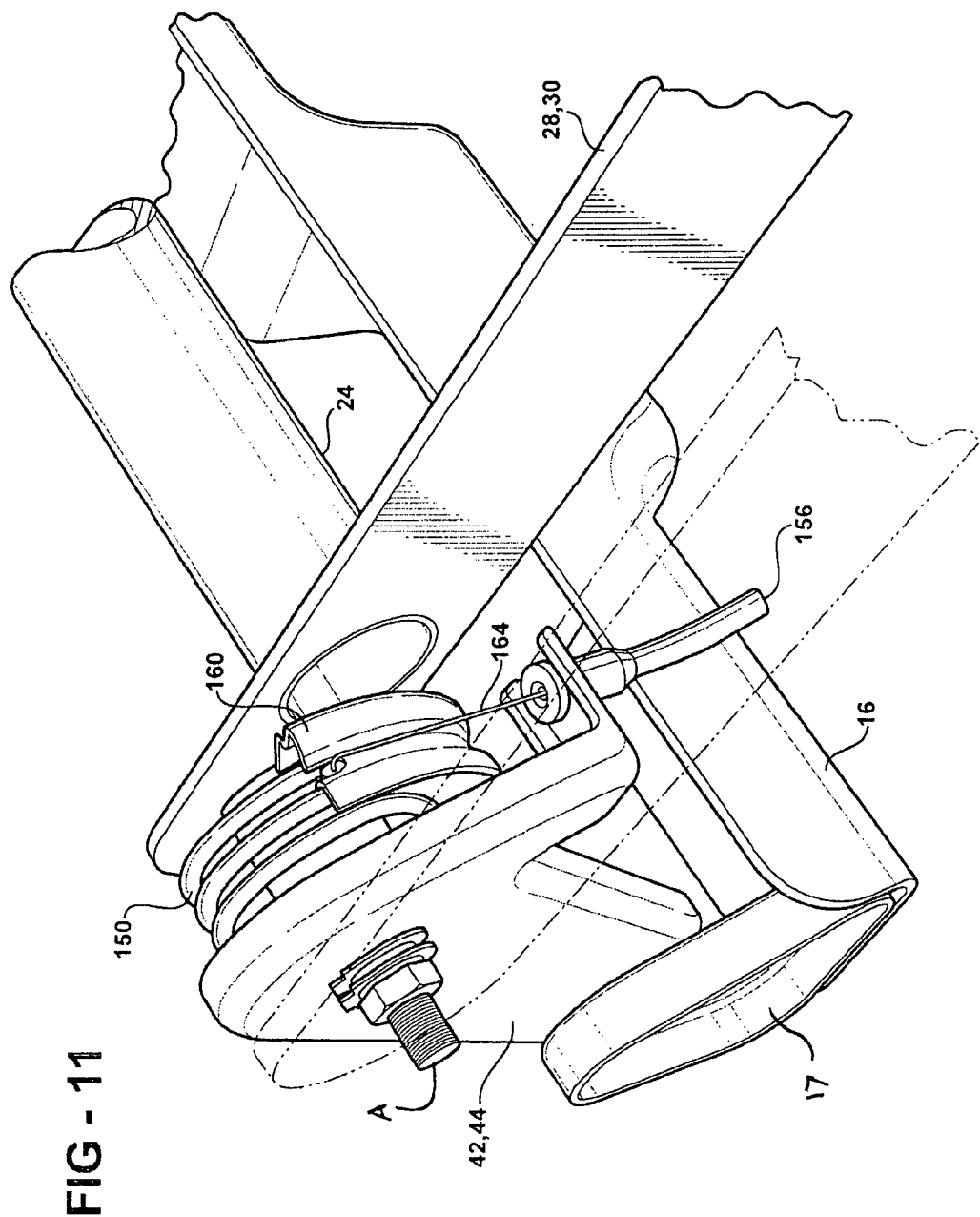
FIG. 11 is a fragmentary perspective view of the seat cushion support legs and auto-fold mechanism.
Figure 12:
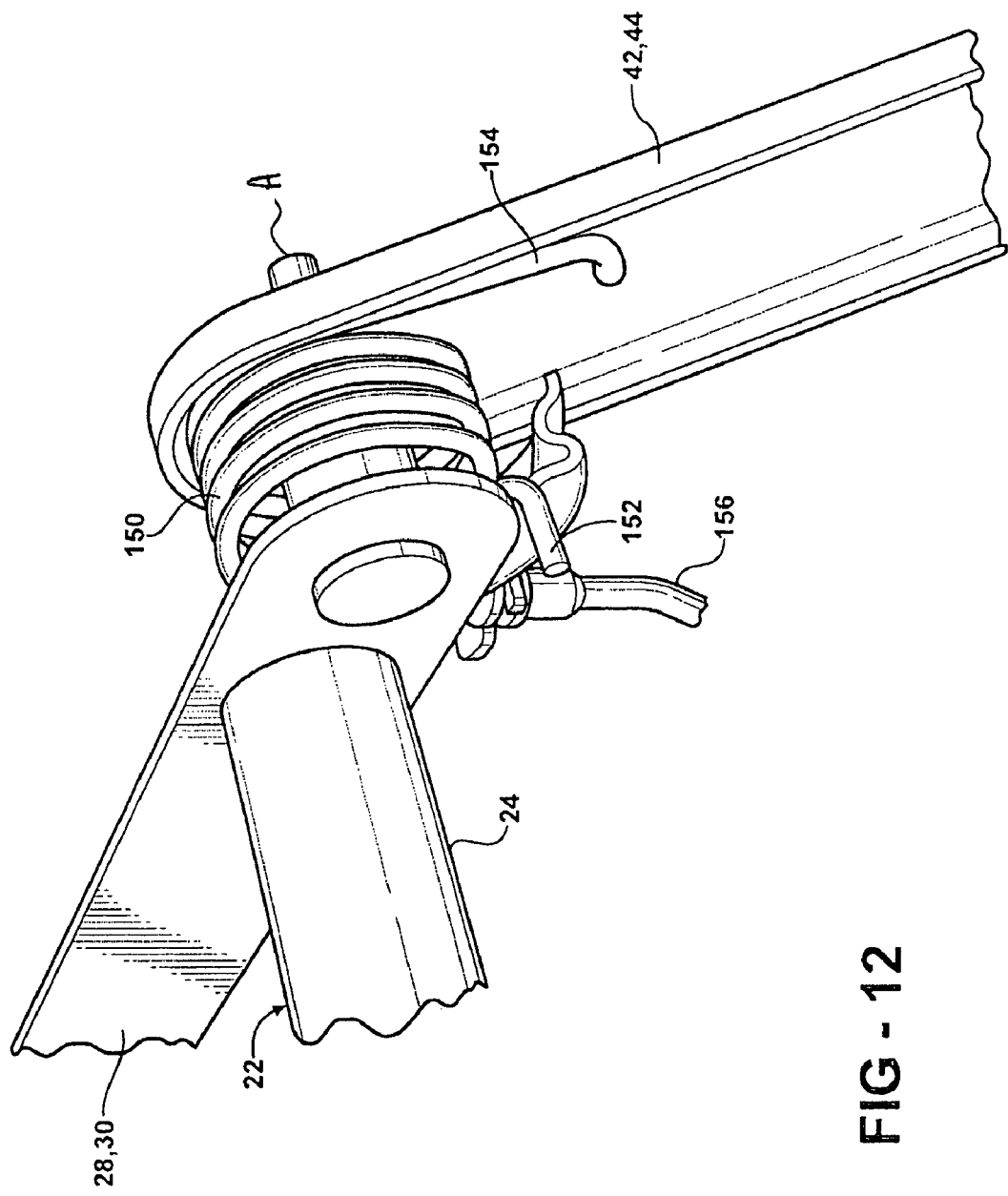
FIG. 12 is another fragmentary perspective view of the seat cushion support leg and auto-fold mechanism.

Referring to FIGS. 7, 11, and 12, the fold flat mechanism 140 further includes a pair of spring bias members, or torsion springs, 150 having a first end 152 fixed to the seat cushion frame 22 and a second end 154 fixed to the front support link 42, 44. The torsion springs 150 automatically bias the seat cushion 12 from the seating position to the fully stowed position. The fold flat mechanism 140 also includes a Bowden type control cable 156 for controlling the automatic pivoting of the seat cushion 12. The recliner bracket 102 includes a first pulley 158 fixedly thereto for supporting and attaching a first end 162 of the control cable 156. The seat cushion frame 22 includes a second pulley 160 fixedly thereto for supporting and attaching a second end 164 of the control cable 156. In operation, as the seat back 14 is pivoted about the second axis of the lower disc recliner 102 from the upright position to the fully stowed position, the control cable 156 unwinds from the first pulley 158 to provide continuous and increment slack in the cable 156 and to the second end 164 thereof wound around the second pulley 160. The slack in the cable 156 allows the torsion springs 150 to automatically pivot the seat cushion 12 from the seating position to the fully stowed position in response to pivoting of the seat back 14 from the upright position to the fully stowed position.

As shown in FIG. 3, if a seat assembly is positioned in front of the seat assembly 10, the seat cushion 12 abuts the seat back thereof and stops in the intermediate stowed position while the seat back 14 continues to pivot to the fully stowed position. If there is not a seat assembly positioned in front of the seat assembly 10 or if the seat assembly is moved forwardly to provide clearance, the seat cushion 12 may continue to pivot or rotate 180 degrees to the fully stowed position shown in FIG. 4 wherein the seat cushion 12 and seat back 14 are aligned flush and parallel to the floor 16 to provide an extended cargo load floor within the vehicle.

Finally, when the seat back 14 is pivotally returned from the fully stowed position to the upright position, the first end 162 of the control cable 156 winds around the first pulley 158 to pull on the second end 164 and pivot the seat cushion 12, against the biasing force of the torsion springs 150, from the fully stowed position back to the seating position. The striker bar 90 is also re-engaged with the latch plate 72 of the seat cushion latch 70 to latch the seat cushion 12 in the seat position.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A seat assembly for supporting a seat occupant above a floor in an automotive vehicle, said seat assembly comprising:
   a pair of front support links configured for pivotal mounting to the floor;
   a seat cushion pivotally supported by said pair of front support links for movement of said seat cushion relative to said pair of front support links about a first axis between a seating position for supporting the seat occupant and a seat cushion stowed position pivoted about the first axis with an underside of said seat cushion facing upwardly;
   a seat back pivotally supported by a pair of recliner mechanisms for operator initiated movement of said seat back about a second axis between an upright home position for supporting a seat occupant and a seat back stowed position with a backside of said seat back facing upwardly;

a pair of J-links, each extending between opposite sides of said seat back and said pair of front support links for automatically driving said seat cushion between said seating position and said seat cushion stowed position in response to pivotal movement of said seat back between said upright home position and said seat back stowed position enabling the backside of said seat back to be co-planar with said underside of said seat cushion, and a pair of support legs pivotally mounted to said seat cushion and operatively connected to said front support links for automatic pivotal movement between a retracted position recessed against said seat cushion and an extended position extending downwardly from said seat cushion in response to pivotal movement of said seat cushion between said seating position and said seat cushion stowed position, said pair of support legs supporting said seat cushion when said seat cushion is in said seat cushion stowed position.

2. A seat assembly as set forth in claim 1, further comprising a torsion spring coupled between said seat cushion and at least one of said front support links for biasing said seat cushion to said seat cushion stowed position.

3. A seat assembly as set forth in claim 2, further comprising a control cable operatively coupled between said seat back and said seat cushion for controlling said biased pivotal movement of said seat cushion as said seat back pivots from said upright position to said seat back stowed position.

4. A seat assembly as set forth in claim 3, further comprising a latch selectively securing said seat cushion to the floor.

5. A seat assembly as set forth in claim 1, wherein each of said recliner mechanisms comprises a first pair of recliners and a second pair of recliners mounted on a bracket, said first pair of recliners pivotally coupling said bracket to rear risers mountable on the floor, said second pair of recliners pivotally coupling said seat back to said bracket, whereby selective operator activation of said first pair of recliners enables said movement of said seat back about said second axis and selective operator activation of said second pair of recliners enables reclining movement of said seat back about a third axis from the upright home position.

6. A seat assembly as set forth in claim 5, wherein said first pair of recliners is operatively ganged to said second pair of recliners.

7. A seat assembly as set forth in claim 5, wherein at least one of said recliner mechanisms has a recliner release lever operatively engaging at least one of said second pair of recliners for effecting selective operator activation thereof.

8. A seat assembly as set forth in claim 7, wherein said at least one of said recliner mechanisms has a stow release lever operatively engaging at least one of said first pair of recliners for effecting selective operator activation thereof.

9. A seat assembly as set forth in claim 8, wherein each of said first recliners are operatively ganged together and each of said second recliners are operatively ganged together, and said recliner release lever is operatively ganged to said stow release lever by a lost motion connection, whereby actuation of said stow release lever activates said second pair of recliners allowing said seat back to return to said home position and activation of the recliner release lever does not activate said stow release lever.

10. A seat assembly as set forth in claim 9, further comprising a torsion spring coupled between said seat cushion and at least one of said front support links for biasing said seat cushion to said seat cushion stowed position.

11. A seat assembly as set forth in claim 10, further comprising a control cable operatively coupled between said seat back and said seat cushion for controlling said biased pivotal movement of said seat cushion as said seat back pivots from said upright position to said seat back stowed position.

12. A seat assembly as set forth in claim 11, further comprising a latch selectively securing said seat cushion to the floor.

13. A seat assembly as set forth in claim 12, said latch is operatively coupled to said stow release lever, whereby activation of said second pair of recliners operatively releases said latch.

14. A seat assembly as set forth in claim 13, further comprising at least one fold flat release lever pivotally mounted to said bracket, said fold flat release lever having a blocking pin selectively engaging said seat back for limiting travel of said seat back to said home position.

15. A seat assembly as set forth in claim 14, wherein said recliner release lever is operatively connected to said fold flat release lever by a lost motion connection enabling said blocking pin to be disengaged from said seat back to enable said seat back to over rotate about said third axis beyond said home position to a fold flat position overlying said seat cushion.

16. A seat assembly as set forth in claim 15, further comprising a front cross support and a rear cross support, said front cross support pivotally receiving said pair of front support links and said rear cross support receiving said rear risers.

17. A seat assembly as set forth in claim 16, wherein said latch is mounted on said rear cross support.

* * * * *